United States Patent
Angot et al.

(10) Patent No.: US 9,228,829 B2
(45) Date of Patent: Jan. 5, 2016

(54) METHOD AND SYSTEM FOR MEASURING DISTANCE

(71) Applicant: INDUSTRIAL TECHNOLOGY RESEARCH INSTITUTE, Hsinchu (TW)

(72) Inventors: Ludovic Angot, Hsinchu (TW); Chuan-Chung Chang, Zhubei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 22 days.

(21) Appl. No.: 14/447,354

(22) Filed: Jul. 30, 2014

(65) Prior Publication Data

US 2015/0117718 A1 Apr. 30, 2015

Related U.S. Application Data

(60) Provisional application No. 61/897,831, filed on Oct. 31, 2013.

(51) Int. Cl.
| | |
|---|---|
| *G06K 9/00* | (2006.01) |
| *G01B 11/14* | (2006.01) |
| *G06K 9/46* | (2006.01) |
| *G01S 1/00* | (2006.01) |
| *G06T 7/00* | (2006.01) |

(52) U.S. Cl.
CPC . *G01B 11/14* (2013.01); *G01S 1/00* (2013.01); *G06K 9/4604* (2013.01); *G06T 7/0065* (2013.01)

(58) Field of Classification Search
None
See application file for complete search history.

(56) References Cited

U.S. PATENT DOCUMENTS

| | | | |
|---|---|---|---|
| 7,170,677 B1 * | 1/2007 | Bendall | A61B 1/0005 348/49 |
| 7,705,970 B2 | 4/2010 | Piestun et al. | |
| 2002/0033953 A1 * | 3/2002 | Hill | B82Y 20/00 356/516 |
| 2002/0041327 A1 * | 4/2002 | Hildreth | G06T 19/006 348/42 |
| 2011/0249866 A1 | 10/2011 | Piestun et al. | |
| 2011/0310226 A1 | 12/2011 | McEldowney | |
| 2012/0069320 A1 | 3/2012 | Simonov et al. | |

(Continued)

FOREIGN PATENT DOCUMENTS

| | | |
|---|---|---|
| CN | 102695939 A | 9/2012 |
| JP | 2963990 B1 | 10/1999 |
| TW | I412725 | 10/2013 |
| TW | M463837 U | 10/2013 |

OTHER PUBLICATIONS

S. Hell, et al., "Diffraction-unlimited three-dimensional optical nanoscopy with opposing lenses," Nature Photonics, vol. 3, Jul. 2009, pp. 381-387, www.nature.com/naturephotonics.

(Continued)

*Primary Examiner* — Bhavesh Mehta
*Assistant Examiner* — Oneal R Mistry
(74) *Attorney, Agent, or Firm* — Muncy, Geissler, Olds & Lowe, P.C.

(57) ABSTRACT

A method and a system for measuring a distance from a reference point to an object are provided. The method comprises the following steps. At least one image of an object is captured through a lens comprising a phase mask composed of a parallel plate and a wedge prism. At least two corresponding regions of interest (ROI) are obtained from the images. The regions of interest correspond to identical portions of the object. The relative coordinates between corresponding locations within the corresponding regions of interest is measured. The distance is calculated according to the relative coordinates.

21 Claims, 10 Drawing Sheets

(56) References Cited

U.S. PATENT DOCUMENTS

2012/0293651 A1 11/2012 Kawamata et al.
2013/0147925 A1 6/2013 Lew et al.
2013/0266210 A1 10/2013 Morgan-Mar et al.
2015/0070471 A1* 3/2015 Loce .................. G06Q 20/38
348/47

OTHER PUBLICATIONS

M. Backlund, et al., "Simultaneous, accurate measurement of the 3D position and orientation of single molecules," Sep. 25, 2012, pp. 1-6, www.pnas.org/cgi/doi/10.1073/pnas.1216687109.

A. Simonov, et al., "Passive ranging and three-dimensional imaging through chiral phase coding," Optics Letters, vol. 36, No. 2, Jan. 15, 2011, pp. 115-117.

C. Zhou, et al., "Computational Cameras: Convergence of Optics and Processing," IEEE Transactions on Image Processing, vol. 20, No. 12, Dec. 2011, pp. 3322-3340.

P. Trouvé, et al., "Passive depth estimation using chromatic aberration and a depth from defocus approach," Applied Optics, vol. 52, No. 29, Oct. 10, 2013, pp. 7152-7164.

S. Lee, et al., "Distance estimation using a single computational camera with dual off-axis color filtered apertures," Optics Express, vol. 21, No. 20, Oct. 7, 2013, pp. 23116-23129.

* cited by examiner ical field

METHOD AND SYSTEM FOR MEASURING DISTANCE

This application claims the benefit of U.S. provisional application Ser. No. 61/897,831, filed Oct. 31, 2013, the subject matter of which is incorporated herein by reference.

TECHNICAL FIELD

The disclosure relates in general to a method and a system for measuring a distance.

BACKGROUND

Accompanying advancements in technologies, various distance measuring devices and methods have been invented. A simple method for measuring a distance from a reference point to an object may be to roll a wheel from the reference point to the object and calculate the number of rotating times of the wheel times the perimeter of the wheel.

Or, a measuring device may emit an infrared ray toward an object and receive the reflected infrared ray for evaluating the distance by recording the time lap between the emitting and the receiving of the infrared ray. Alternatively, the phase of a modulated light beam can be measured to provide the distance information. Such devices use a technology called "Time Of Flight". They suffer from noise created by strong reflecting objects and many can't be used in natural daylight. Those measuring devices and methods are limited to be used in some particular environments. Other devices based on stereo matching can be used under natural light and outdoors but require intensive computations. There is a need for a new device and method for measuring distances both in and outdoors, and with less intensive computations.

SUMMARY

The disclosure is directed to a method and a system for measuring a distance from a reference point to an object.

According to one embodiment, a method for measuring a distance from a reference point to an object is provided. The method comprises the following steps. At least one image of the object is captured through a lens comprising a phase mask composed of a parallel plate and a wedge prism. At least two corresponding regions of interest (ROI) is obtained from two sub-images of the at least one image. The at least two ROI correspond to an identical portions of the object. One of the at least two ROI is captured through the parallel plate and another one of the at least two ROI is captured through the wedge prism. Relative coordinates is measured according to the at least two corresponding ROI. The distance is calculated according to the relative coordinates.

According to another embodiment, a system for measuring a distance from a reference point to an object is provided. The system includes an image capturing unit, an image processing unit and a processing unit. The image capturing unit is for capturing at least one image. The image capturing unit includes an image sensor, a lens and a phase mask. The phase mask is composed of a parallel plate and a wedge prism. The phase mask is disposed at an aperture stop of the lens. The image processing unit is for obtaining at least two corresponding regions of interest (ROI) from the at least one image. One of the at least two ROI is captured through the parallel plate and another one of the at least two ROI is captured through the wedge prism. The processing unit is for calculating the distance. The image processing unit measures relative coordinates according to the at least two ROI, and the processing unit calculates the distance according to the relative coordinates.

Figure 1:
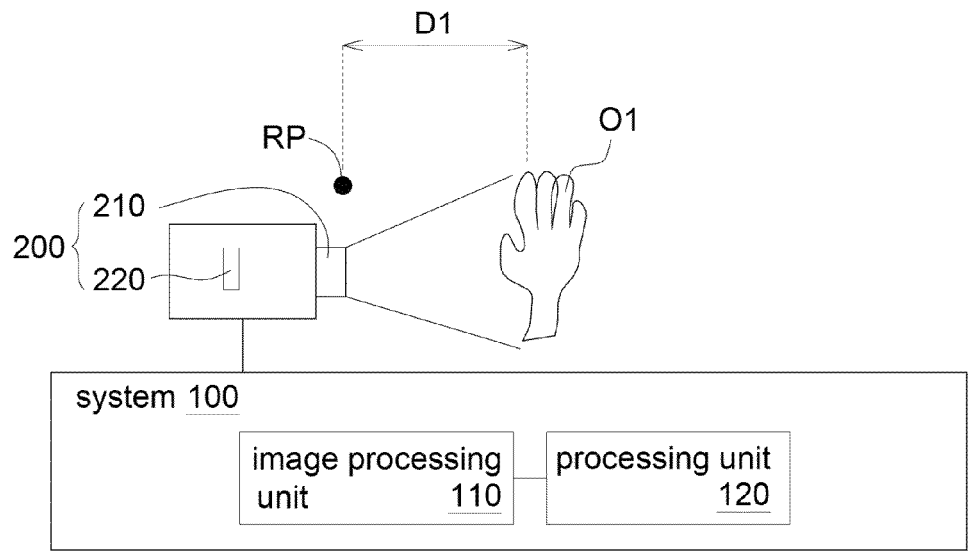
FIG. 1 shows a system for measuring a distance from a reference point RP to an object.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

FIG. 1 shows a system 100 for measuring a distance D1 from a reference point RP to an object O1. The system 100 comprises an image processing unit 110, and a processing unit 120. The system 100 is connected to an image capturing unit 200. The image capturing unit 200 includes a lens module 210 and a sensor 220. The image capturing unit 200 is used for capturing one or more images of the object O1 and transmitting the one or more images to the system 100 for measuring the distance D1.

The image processing unit 110 is used for analyzing a plurality of features of an image. For example, the image processing unit 110 may be a chip, a circuit board, a storage medium storing a plurality of program codes or an integrated circuit having a function of image processing.

The image processing unit 110 is used for measuring a plurality of geometric values on image data.

The processing unit 120 is used for performing calculating processes. For example, the processing unit 120 may be a chip, a circuit board, a storage medium storing a plurality of program codes or a circuit having a function of calculating.

Figure 2:
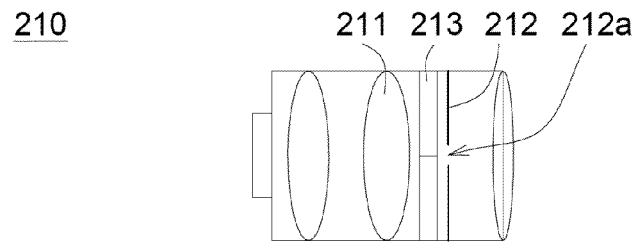
FIG. 2 shows a lens module of an image capturing unit in FIG. 1.
Figure 3:
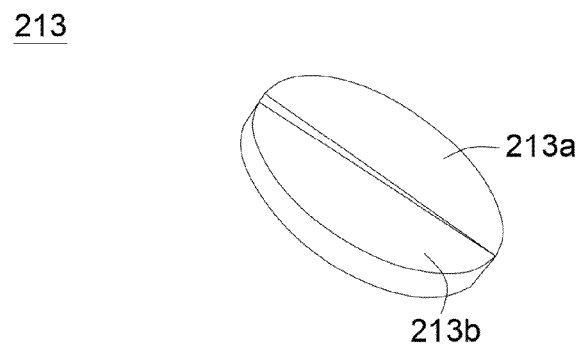
FIG. 3 shows a phase mask of FIG. 2
Figure 4A:
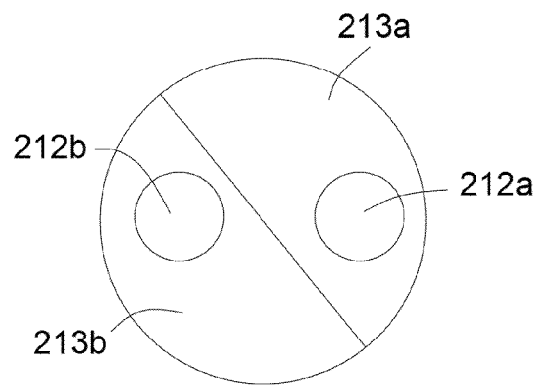
FIGS. 4A to 4C shows some examples of the arrangement of a parallel plate, a wedge prism and an aperture.
Figure 4B:
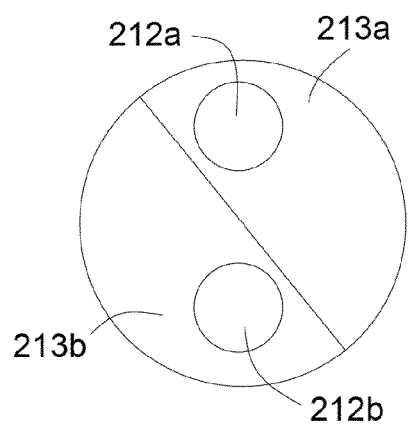
Figure 4C:
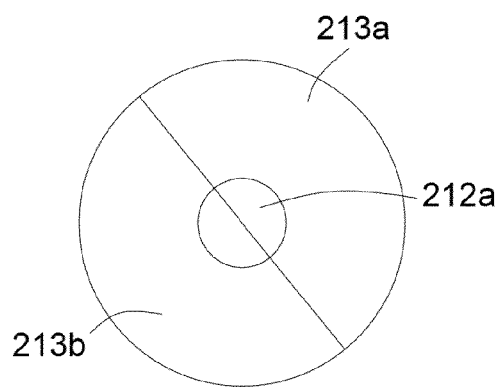

FIG. 2 shows the lens module 210 of the image capturing unit 200 in FIG. 1. The lens module 210 includes at least one optical element 211, an aperture stop 212 and a phase mask 213. The light reflected from the object O1 (shown in FIG. 1) passes through at least one aperture 212a of the aperture stop 212 and then passes through the phase mask 213. FIG. 3 shows the phase mask 213 of FIG. 2. In the one embodiment, the phase mask 213 includes a parallel plate 213a and a wedge prism 213b. The angle of the wedge prism 213b may range from 0.5 to 5 degrees, such as 1 degree. The light passing through the wedge prism 213b will be refracted in a manner different from that of the light passing through the parallel plate 213a, such that two sub-images shifted from each other will be captured on the sensor 220 (shown in FIG. 1). FIGS. 4A to 4C shows some examples of the arrangement of the parallel plate 213a, the wedge prism 213b and the aperture 212a. In FIG. 4A, two apertures 212a and 212b are disposed along a horizontal line. The aperture 212a is used for passing light through the parallel plate 213a and the aperture 212b is used for passing light through the wedge prism 213b. In FIG. 4B, two apertures 212a and 212b are disposed at a vertical line. The aperture 212a is used for passing light through the parallel plate 213a and the aperture 212b is used for passing light through the wedge prism 213b. In FIG. 4C, only one aperture 212a is disposed at the center. Half of the aperture 212a is used for passing light through the parallel plate 213a and half of the aperture 212a is used for passing light through the wedge prism 213b.

Figure 5:
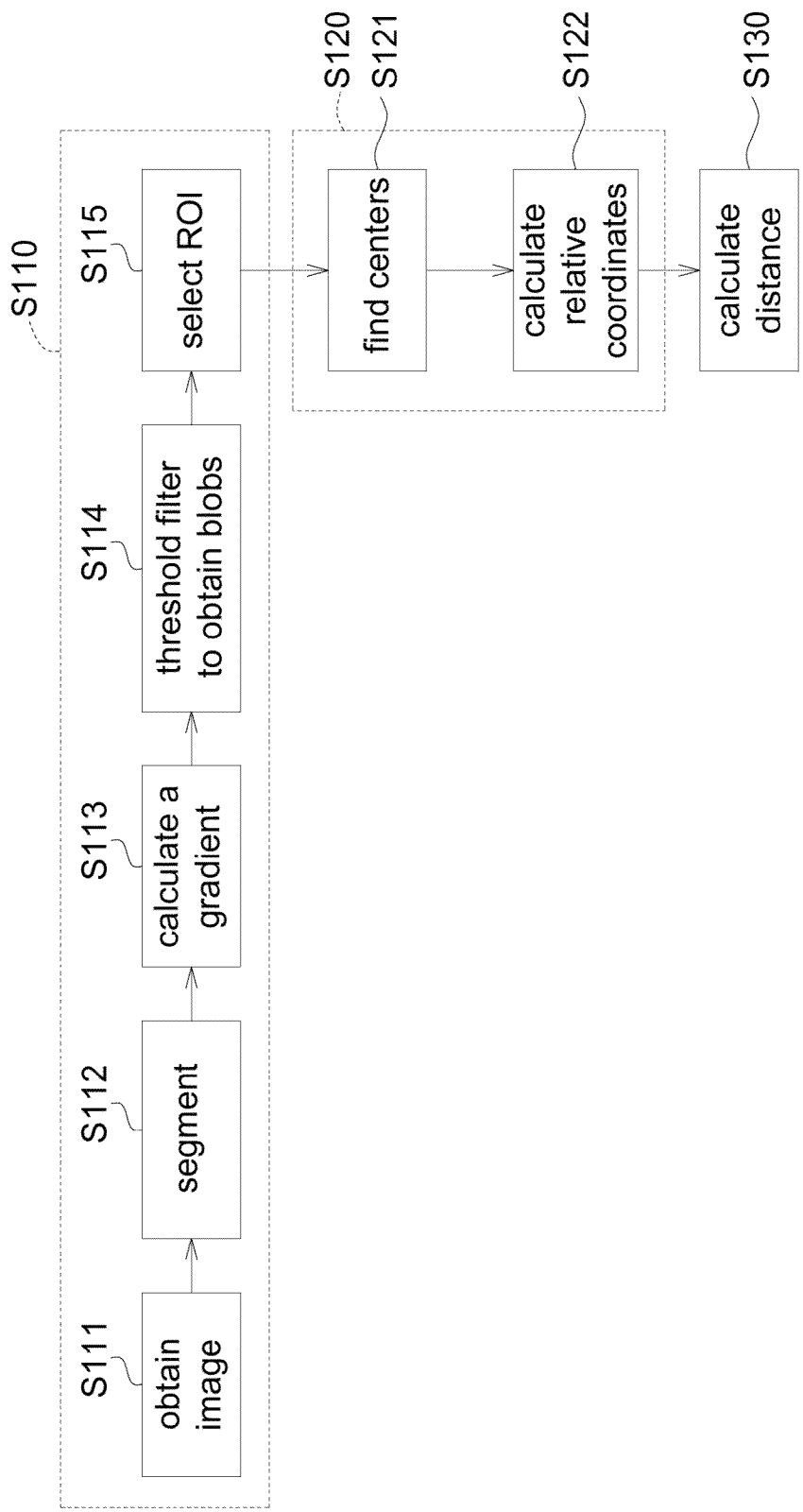
FIG. 5 illustrates a flow chart of a method for measuring the distance from the reference point RP to the object.
Figure 6A:
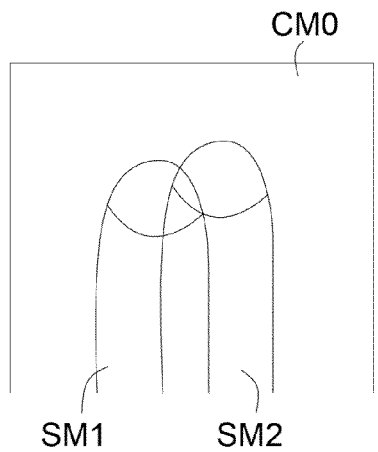
FIGS. 6A to 6E show an example of performing the method of FIG. 5.
Figure 6B:
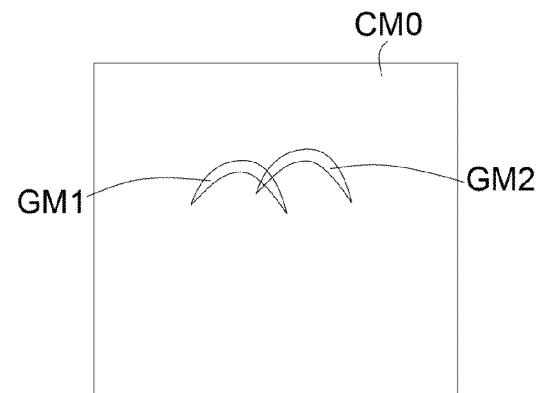
Figure 6C:
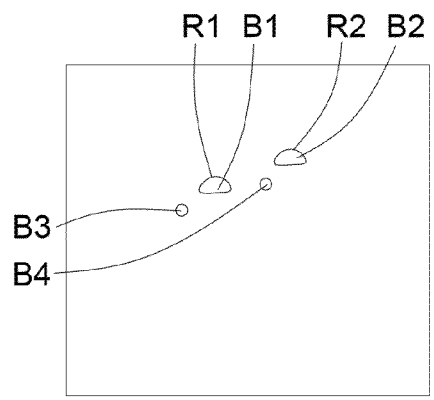

Referring to FIGS. 1, 5, and 6A to 6E, FIG. 5 illustrates a flow chart of a method for measuring the distance D1 from the reference point RP to the object O1, and FIGS. 6A to 6E show an example of performing the method of FIG. 5. In step S110, as shown in FIGS. 6A to 6C, the image processing unit 110 obtains at least two corresponding regions of interest (ROI) corresponding to 2 sub-images captured by the image capturing unit, such as regions of interest R1 and R2 shown in FIG. 6C. The region of interest R1 is captured through the parallel plate 213a and the region of interest R2 is captured through the wedge prism 213b.

In detail, the step S110 includes sub-steps S111 to S115. In step S111, as shown in FIG. 6A, the image processing unit 110 obtains a captured image CM0 comprising at least two sub-images of the object O1, such as sub-images SM1 and SM2. The sub-image SM1 is captured through the parallel plate 213a and the sub-image SM2 is captured through the wedge prism 213b. As shown in FIG. 6A, the sub-image SM2 is shifted from the sub-image SM1.

In optional step S112, as shown in FIG. 6A, the image processing unit 110 segments the captured image CM0 into the sub-image SM1 and the sub-image SM2.

In step S113, as shown in FIG. 6B, the image processing unit 110 obtains gradient images GM1 and GM2 by calculating a gradient in an arbitrary direction on the sub-images SM1 and SM2. In FIG. 6A, each of the sub-images SM1 and SM2 illustrate a finger. In FIG. 6B, each of the gradient images GM1 and GM2 only shows the tip of the finger. The gradient here is computed along horizontal edges, hence substantially eliminating vertical edges.

In step S114, as shown in FIG. 6C, the image processing unit 110 performs a threshold filtering on the gradient images GM1 and GM2 to obtain a plurality of contiguous pixels grouped in blobs, such as blobs B1 to B4. Blobs B1 and B3 correspond to the sub-image SM1 and blobs B2 and B4 correspond to the sub-image SM2. The couple of blobs B1, B3 and blobs B2, B4 belongs to the same corresponding regions of the two sub-images SM1 and SM2.

In step S115, as shown in FIG. 6C, the image processing unit 110 selects at least two of the blobs, such as blobs B1 and B2 corresponding to identical portion of the object O1 to be the corresponding regions of interest, such as regions of interest R1 and R2. In this step, the blobs B1 to B4 are filtered by size and this step eliminates the smaller blobs B3 and B4. Blobs B1 and B2 are selected to be the regions of interest R1 and R2. The regions of interest R1 and R2 are obtained through steps S111 to S115.

Figure 6D:
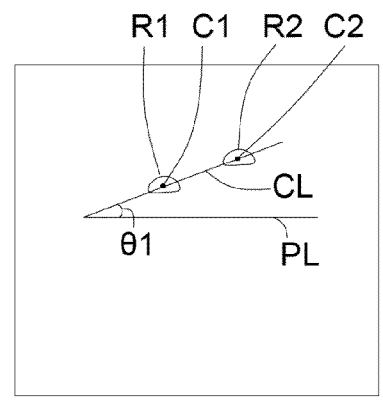
Figure 6E:
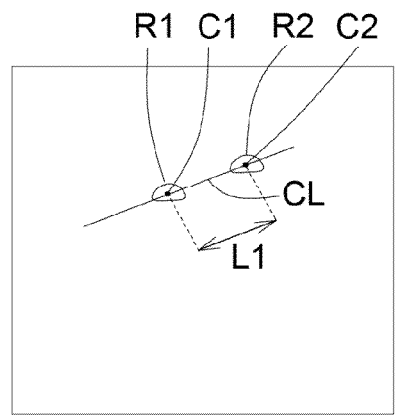

In step S120, as shown in FIG. 6D or FIG. 6E, the processing unit 120 measures a relative coordinate between the corresponding regions of interest R1 and R2. In detail, the step S120 includes sub-steps S121 and S122.

In step S121, as shown in FIG. 6D or FIG. 6E, the processing unit 120 finds centers C1 and C2 of the regions of interest R1 and R2. The centers C1 and C2 may be geometric centers of the regions of interest R1 and R2.

In step S122, as shown in FIG. 6D or FIG. 6E, the processing unit 120 measures the relative coordinate between the centers C1 and C2. In FIG. 6D, the relative coordinate between centers C1 and C2 is measured as an angle $\theta 1$ between a predetermined line PL and a connecting line CL connecting the centers C1 and C2. In FIG. 6E, the relative coordinate between the centers C1 and C2 is a segment of length L1 part of the connecting line CL connecting the centers C1 and C2.

Figure 7:
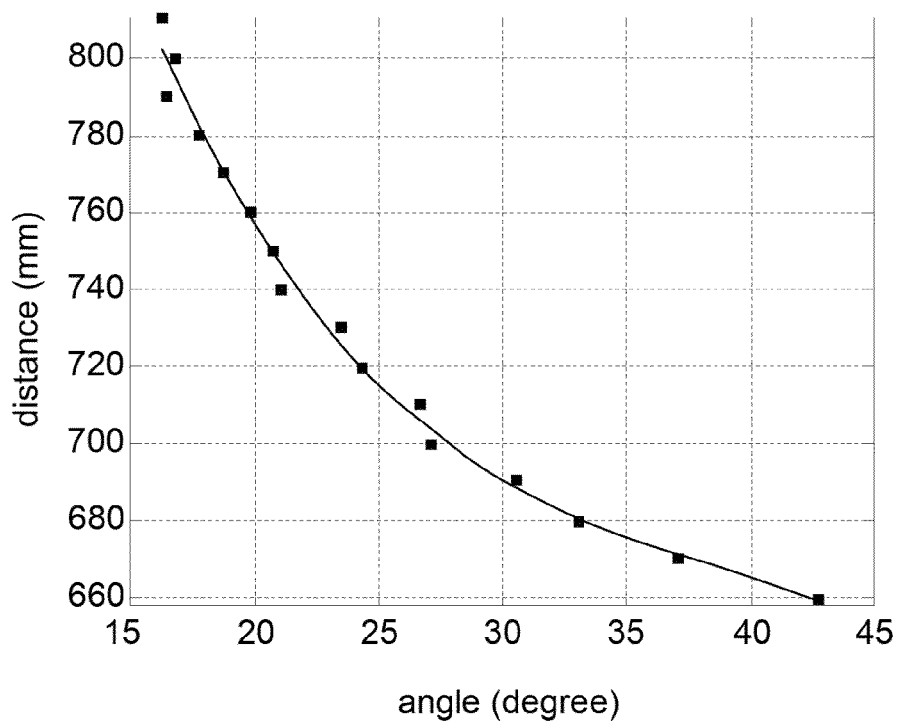
FIG. 7 shows a curve representing the relationship between an angle and the distance.

In step S130, the processing unit 120 calculates the distance D1 from the reference point to the object according to the relative coordinates. FIG. 7 shows a curve CR representing the relationship between the angle $\theta 1$ and the distance D1. The curve is obtained by performing a polynomial interpolation on experimental points. The experimental points are obtained through an offline calibration step, by computing angles O1 for an object located at various known distances. The curve CR can also be obtained by simulating the image capturing unit 200 using an optical simulation software such as zemax.

In one embodiment, another calibration curve representing the relationship between the length L1 and the distance D1 can be obtained by experiment or simulation. Distance D1 is obtained according to this curve by measuring length L1.

In one embodiment, a look up table (LUT) can be obtained by experiment or simulation. According to the look up table, if any particular angle $\theta 1$ or length L1 is measured, then the corresponding distance D1 can be found or estimated by interpolation.

Based on the above, the distance D1 from the reference point RP to the object O1 can be measured by using the phase mask 213 configured in only one image capturing unit 200.

In one embodiment, at least two filters responding to two different wavelength can be disposed in front of the phase mask 213 for obtaining the regions of interest. Referring to FIGS. 1, 8 to 9B, FIG. 8 illustrates a flow chart of another method for measuring the distance D1 from the reference point RP to the object O1, and FIGS. 9A and 9B show an example of performing the method of FIG. 8.

Figure 9A:
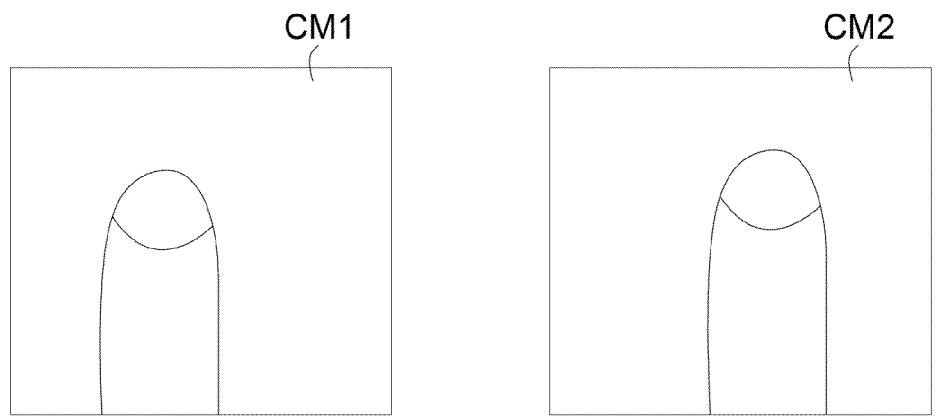
FIGS. 9A to 9B show an example of performing the method of FIG. 8.
Figure 10:
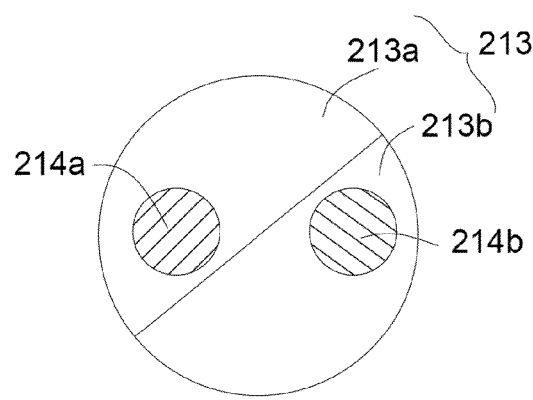
FIG. 10 shows one example of the arrangement of filters and the phase mask.

In S211, as shown in FIG. 9A, the image processing unit 110 captures at least two images, such as images CM1 and CM2, through at least two filters, such as filters 214a and 214b shown in FIG. 10, which allow different wavelength lights to pass respectively. The two images can be obtained by a step of color channel separation. FIG. 10 shows one example of the arrangement of the filters 214a, 214b and the phase mask 213. The filter 214a is disposed in front of the parallel plate 213a of the phase mask 213, and the filter 214b is disposed in front of the wedge prism 213b of the phase mask 213.

Figure 11:
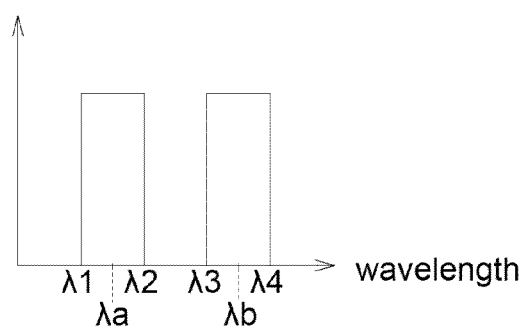
FIG. 11 shows the spectral response of the filters.

In one embodiment, both filters 214a and 214b may be used for passing visible light. For example, the filter 214a passes green light while the filter 214b passes red light. In one embodiment, one of the filters 214a and 214b may be used for passing visible light, and another one of the filters 214a and 214b may be used for passing invisible light. This then allows to capture simultaneously a visible light image and an image in the invisible domain of the optical spectrum and perform a distance measurement. FIG. 11 shows an example of the transmission characteristics of the filters 214a and 214b. The filter 214a allows a first light whose wavelength is centered on λa, for example λa=500 nm, and which spectrum ranges from λ1 to λ2 to pass. The filters 214b allow a second light which wavelength is centered on λb, for example λb=600 nm, and which spectrum ranges from λ3 to λ4 to pass. The filters are designed so that λ3>λ2.

In step S212, as shown in FIG. 9B, the image processing unit 110 obtains a plurality of blobs B5 to B8 corresponding to groups of pixels in the captured images CM1 and CM2.

In step S115, as shown in FIG. 9B, the image processing unit 110 selects at least two of the blobs, such as bobs B5 and B6, corresponding to identical portion of the object O1 to be corresponding regions of interest R3 and R4.

Figure 8:
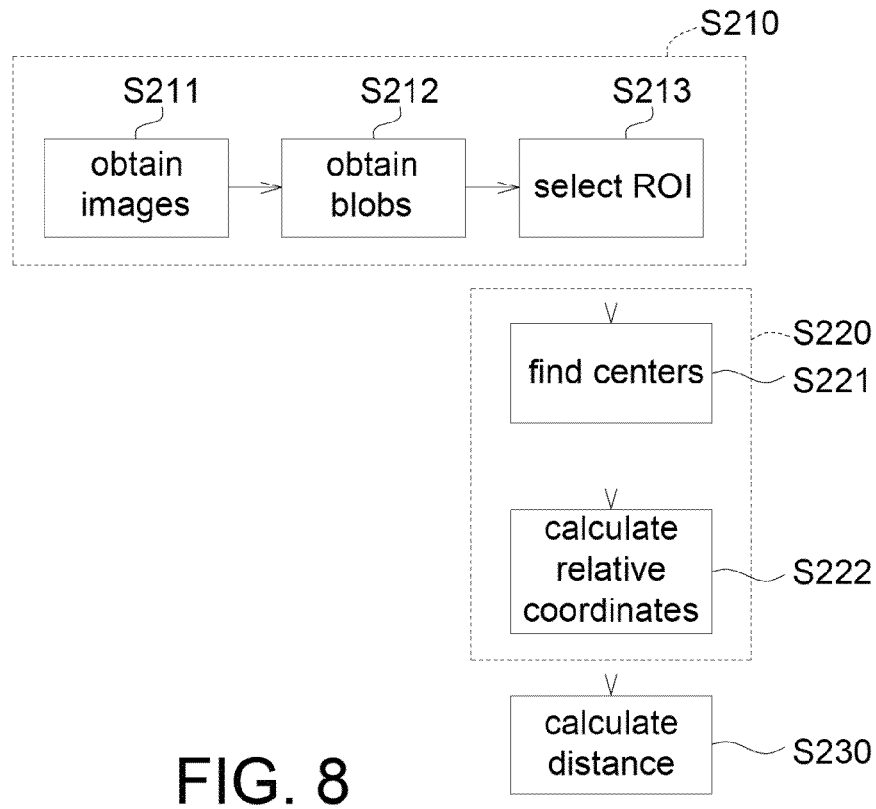
FIG. 8 illustrates a flow chart of another method for measuring the distance from the reference point to the object.
Figure 9B:
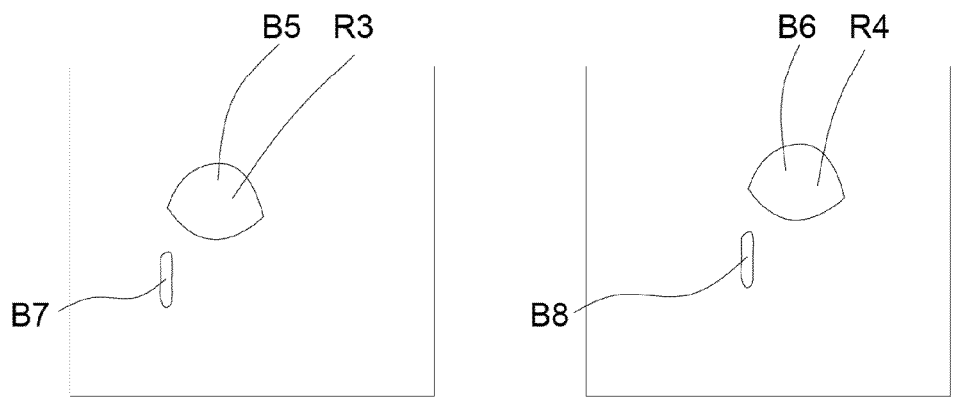

The steps S213, S220, S221, S222 and S230 of FIG. 8 are similar to the description of the steps of S115, S120, S121, S122 and S130 of FIG. 5. Based on the steps above, the distance D1 from the reference point RP to the object O1 can be measured.

Figure 12:
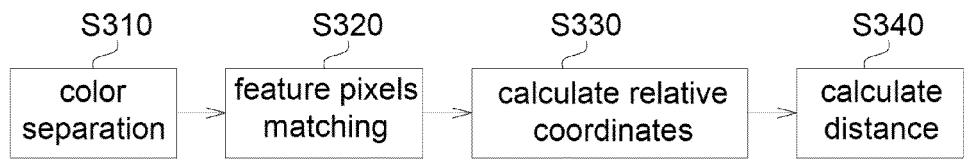
FIG. 12 shows a flowchart of segmenting and distance calculating method by using the phase mask of FIG. 10.

In another embodiment, FIG. 12 shows a flowchart of segmenting and distance calculating method by using the phase mask 213 of FIG. 10. In step S310, a color separation is performed in order to obtain two image, such as CM1 and CM2 on FIG. 9A. For example one image is obtained from a green channel captured through filter 214a and one image is obtained from a red channel captured through filter 214b. In step S320, a feature pixels matching is performed. It consists in finding corresponding pixels in images CM1 and CM2. In step S330, a relative coordinate between these pixels is calculated. In step S340, the distance to the object can be obtained according to the angle and distance between the feature pixels, by relating the relative coordinate of each matched pixels with a distance through a calibration curve such as FIG. 7.

Figure 13:
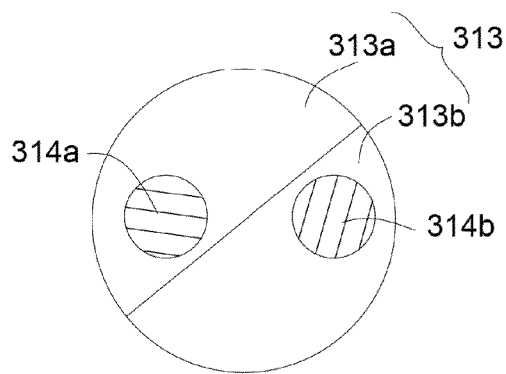
FIG. 13 shows another example of a phase mask.

FIG. 13 shows another example of a phase mask 313. In one embodiment, the phase mask 313 includes a filter 314a for passing visible light and a filter 314b for passing invisible light. The filter 314a is disposed in front of the parallel plate 313a of the phase mask 313, and the filter 314b is disposed in front of the wedge prism 313b of the phase mask 313.

Figure 14:
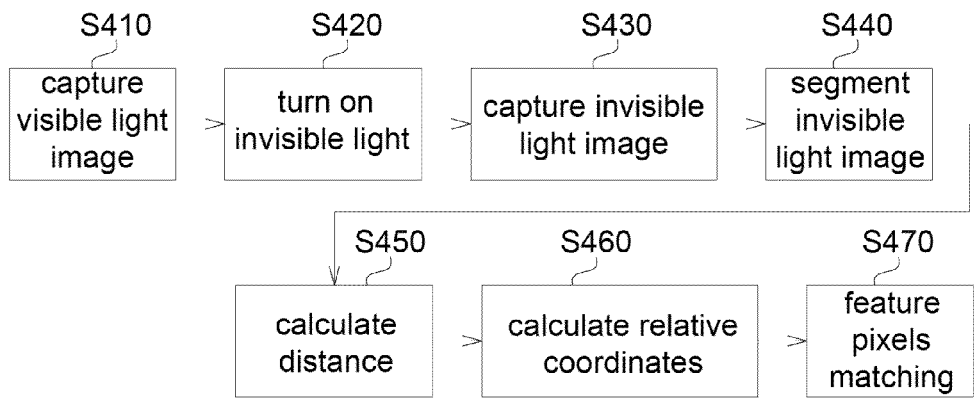
FIG. 14 shows a flowchart of segmenting and distance calculating method by using the phase mask of FIG. 13.

FIG. 14 shows a flowchart of segmenting and distance calculating method by using the phase mask 313 of FIG. 13. In step S410, a visible light image is captured by receiving the visible light passing through the filter 314a. In step S420, the invisible light is turned. In step S430, an invisible light image is captured by receiving the invisible light passing through the filter 314b. In step S440, the invisible light image is segmented. The segmentation can be done for example by subtracting the image captured under invisible light from that captured under visible light. In step S450, a feature pixels matching process is performed. For example, two centers of two regions of interests in the visible light image and the invisible light image can be obtained. In step S460, relative coordinates between the feature pixels can be calculated. In step S470, the distance to the object can be obtained according to the angle and distance between the feature pixels.

Figure 15:
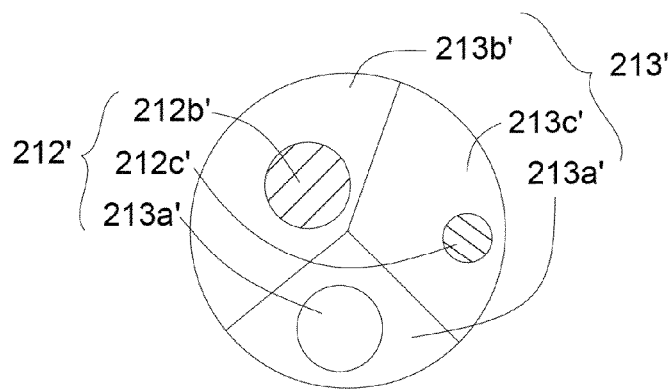
FIG. 15 shows another example of the aperture stop and the phase mask.
Figure 16:
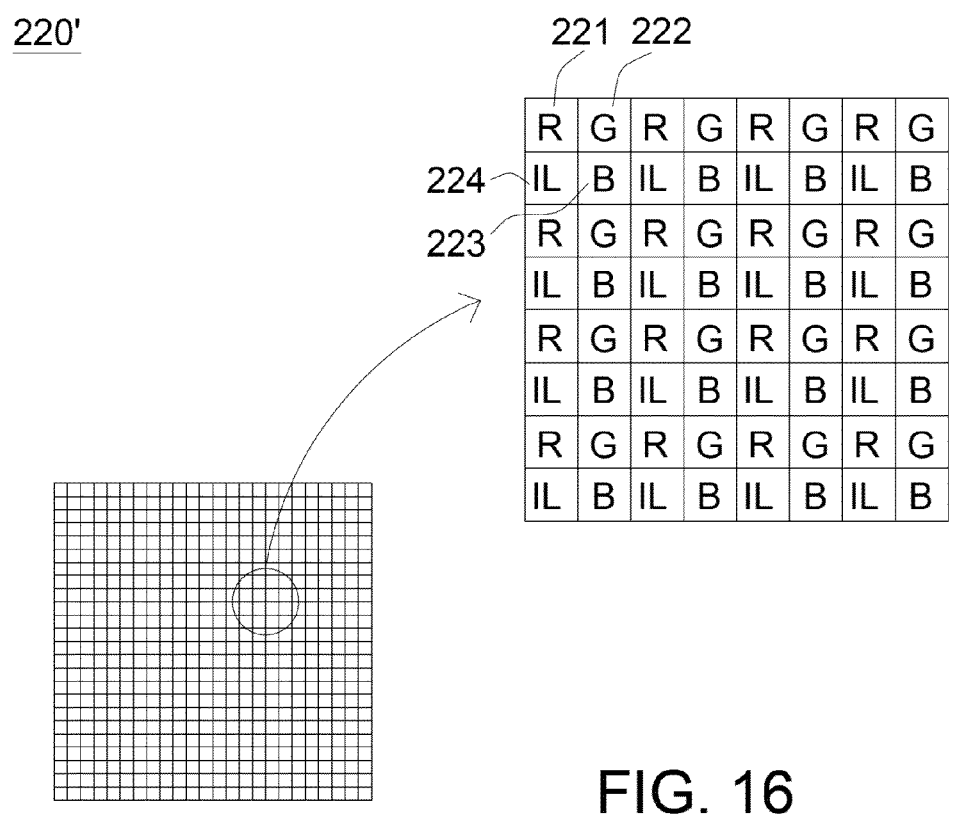
FIG. 16 shows a hybrid sensor.

FIG. 15 shows another example of an aperture stop 212' and a phase mask 213'. In one embodiment, the aperture stop 212' has three apertures 212a', 212b', 212c', and the phase mask 213' has one parallel plate 213a' and two wedge prisms 213b', 213c'. The size of the apertures 212a', 212b', 212c' controls the depth of field of the captured images and their disposition controls the respective location of the captured images. FIG. 16 shows a hybrid sensor 220'. In one embodiment, the images CM1 and CM2 of FIG. 9A can be captured by the hybrid sensor 220' having at least two sets of pixels sensitive to different wavelength lights respectively. For example, the hybrid sensor 220' has a plurality of pixels 221 sensitive to red light, a plurality of pixels 222 sensitive to a green light, a plurality of pixels 223 sensitive to a blue light, and plurality of pixels 224 sensitive to an invisible light. Such filter used in combination with the phase mask 213 where the filter 214a is a visible pass filter and the filter 214b is an infrared bandpass filter can be used to simultaneously capture a visible light image and an infrared image.

Figure 17:
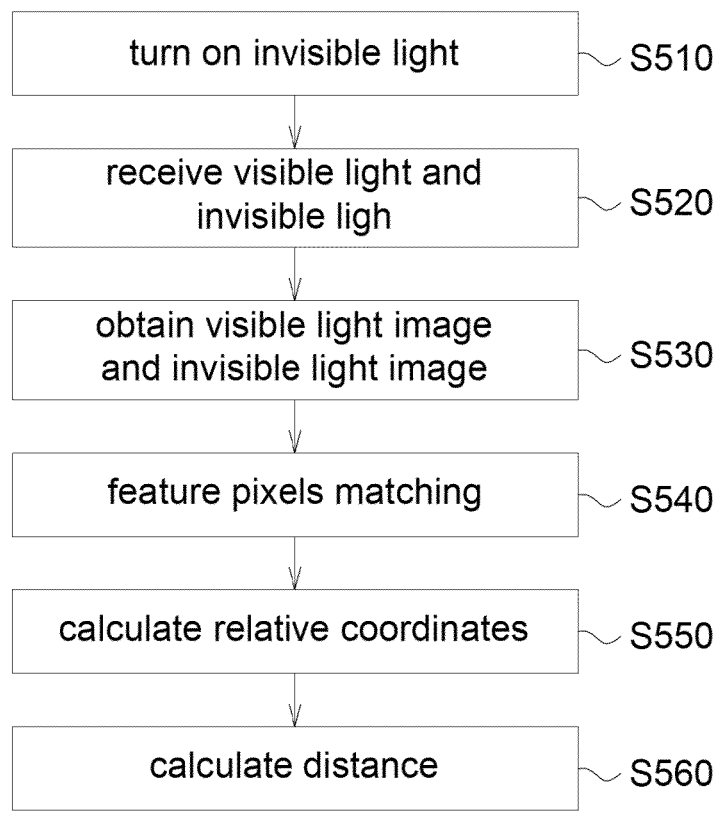
FIG. 17 shows a flowchart of segmenting and distance calculating method by using the phase mask of FIG. 13 and the hybrid sensor of FIG. 16.

FIG. 17 shows a flowchart of segmenting and distance calculating method by using the phase mask 313 of FIG. 13 and the hybrid sensor 220' of FIG. 16. In step S510, an invisible light is turned on. In step S520, the visible light passing through the filter 314a and the invisible light passing through the filter 314b are received. In step S430, a visible light image and an invisible light image are obtained by the hybrid sensor 220' by a demosaicking operation. In step S540, a feature pixels matching process is performed. For example, two centers of two regions of interests in the visible light image and the invisible light image can be obtained. In step S550, relative coordinates between the feature pixels can be calculated. In step S560, the distance to the object can be obtained according to the angle and distance between the feature pixels. Based on varied embodiments above, the distance D1 from the reference point RP to the object O1 can be measured.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A method for measuring a distance from a reference point to an object, comprising:
   capturing at least one image of the object through a lens comprising a phase mask composed of a parallel plate and a wedge prism;
   obtaining at least two corresponding regions of interest (ROI) from two sub-images of the at least one image, wherein the at least two ROI correspond to an identical portion of the object, one of the at least two ROI is captured through the parallel plate and another one of the at least two ROI is captured through the wedge prism;
   measuring relative coordinates according to the at least two corresponding ROI; and
   calculating the distance according to the relative coordinates.

2. The method for measuring the distance from the reference point to the object according to claim 1, wherein the step of obtaining the at least two corresponding ROI comprises:
   obtaining at least two gradient images by calculating a gradient on the two sub-images;
   performing a threshold filtering on the at least two gradient images to obtain a plurality of contiguous pixels grouped in blobs; and selecting at least two of the plurality of contiguous pixels grouped in blobs corresponding to the identical portion of the object as the at least two corresponding ROI.

3. The method for measuring the distance from the reference point to the object according to claim 1, wherein the step of measuring the relative coordinates according to the at least two ROI comprises:
determining a center of each of the at least two ROI; and
measuring the relative coordinates between the centers.

4. The method for measuring the distance from the reference point to the object according to claim 3, wherein in the step of measuring the relative coordinates between the at least two ROI, the relative coordinates comprises an angle between a predetermined line and a connecting line connecting the centers of the at least two ROI.

5. The method for measuring the distance from the reference point to the object according to claim 3, wherein in the step of measuring the relative coordinates according to the at least two corresponding ROI, the relative coordinate comprises a length of a connecting line connecting the centers of the at least two ROI.

6. The method for measuring the distance from the reference point to the object according to claim 1, wherein
in the step of capturing the at least one image, the two sub-images pass through at least two filters respectively with different center wavelengths, and the two sub-images are disposed on front or behind the parallel plate and the wedge prism, and one of the two sub-images is captured through the parallel plate and another one of the two sub-images is captured through the wedge prism; the step of measuring the relative coordinates comprises: obtaining a plurality of matching pixels in the at least two ROI, and measuring the relative coordinates between matching pixels.

7. The method for measuring the distance from the reference point to the object according to claim 6, wherein the at least two filters are used for passing visible light.

8. The method for measuring the distance from the reference point to the object according to claim 6, wherein one of the at least two filters is used for passing visible light, and another one of the at least two filters is used for passing invisible light.

9. The method for measuring the distance from the reference point to the object according to claim 6, wherein the two sub-images are captured through at least two apertures of different sizes.

10. The method for measuring the distance from the reference point to the object according to claim 6, wherein the two sub-images are obtained by a hybrid sensor having at least two sets of pixels sensitive to different wavelength respectively, and the at least two sets of pixels comprise pixels sensitive to visible light and pixels sensitive to infrared light.

11. A system for measuring a distance from a reference point to an object, comprising:
an image capturing unit for capturing at least one image, the image capturing unit comprising:
an image sensor;
a lens; and
a phase mask composed of a parallel plate and a wedge prism,
wherein the phase mask is disposed at an aperture stop of the lens;
an image processing unit for obtaining at least two corresponding regions of interest (ROI) from the at least one image, wherein one of the at least two ROI is captured through the parallel plate and another one of the at least two ROI is captured through the wedge prism; and
a processing unit for calculating the distance;
wherein the image processing unit measures relative coordinates according to the at least two ROI, and the processing unit calculates the distance according to the relative coordinates.

12. The system for measuring the distance from the reference point to the object according to claim 11, wherein the image processing unit is further for
segmenting the at least one image into two sub-images, one of the two sub-images being captured through the parallel plate and another one of the two sub-images being captured through the wedge prism;
obtaining at least two gradient images by calculating a gradient in a predetermined direction on the two sub-images;
performing a threshold filtering on the at least two gradient images to obtain a plurality of blobs; and
selecting at least two of the blobs corresponding to identical portions of the object as the at least two ROI.

13. The system for measuring the distance from the reference point to the object according to claim 11, wherein the image processing unit is further for determining a center of each ROI; and measuring the relative coordinates between the centers.

14. The system for measuring the distance from the reference point to the object according to claim 13, wherein the relative coordinate comprises an angle between a predetermined line and a connecting line connecting the centers.

15. The system for measuring the distance from the reference point to the object according to claim 13, wherein the relative coordinate comprises a length of a connecting line connecting the centers.

16. The system for measuring the distance from the reference point to the object according to claim 11, wherein the two sub-images pass through at least two filters with different center wavelengths and are disposed in front or behind the parallel plate and the wedge prism, one of the two sub-images is captured through the parallel plate, another one of the two sub-images is captured through the wedge prism, and the processing unit is further for obtaining a plurality of corresponding matching pixels in the at least two ROI, and measuring relative coordinates between the matching pixels.

17. The system for measuring the distance from the reference point to the object according to claim 16, wherein the filters are used for passing visible light.

18. The system for measuring the distance from the reference point to the object according to claim 16, wherein one of the filters is used for passing visible light, and another one of the filters is used for passing invisible light.

19. The system for measuring the distance from the reference point to the object according to claim 16, wherein the two sub-images are respectively captured through at least two apertures which size are different.

20. The system for measuring the distance from the reference point to the object according to claim 16, wherein the two sub-images are obtained by a hybrid sensor having at least two sets of pixels, one set of the pixels is sensitive to visible light, and another set of the pixels is sensitive to invisible light.

21. The system for measuring the distance from the reference point to the object according to claim 16, further comprising an invisible light source.

* * * * *